US008621561B2

(12) United States Patent
Cross et al.

(10) Patent No.: US 8,621,561 B2
(45) Date of Patent: Dec. 31, 2013

(54) SELECTIVE AUTHORIZATION BASED ON AUTHENTICATION INPUT ATTRIBUTES

(75) Inventors: David B. Cross, Redmond, WA (US);
Mark F. Novak, Newcastle, WA (US);
Oded Ye Shekel, Bellevue, WA (US);
Paul J. Leach, Seattle, WA (US);
Andreas Luther, Kirkland, WA (US);
Thomas C. Jones, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/969,456

(22) Filed: Jan. 4, 2008

(65) Prior Publication Data
US 2009/0178129 A1 Jul. 9, 2009

(51) Int. Cl.
*H04L 29/06* (2006.01)
*G06F 21/00* (2013.01)

(52) U.S. Cl.
USPC ............... 726/2; 726/1; 726/3; 726/4; 726/5; 726/6; 726/7; 726/9; 726/10; 726/16; 726/17; 726/18; 726/19; 726/20; 726/21; 726/26; 726/27; 726/28; 726/29; 726/30; 713/155; 713/156; 713/159; 713/168; 713/169; 713/172; 713/173; 713/182; 713/183; 713/184; 713/185; 713/186; 705/65; 705/66; 705/67; 705/72; 705/76; 709/217; 709/219; 709/225; 709/229

(58) Field of Classification Search
USPC ................ 726/1–21, 26–30; 713/155–159; 713/168–175, 182–186; 705/64–80; 709/217–229
See application file for complete search history.

(56) References Cited

U.S. PATENT DOCUMENTS

| 4,868,877 | A | * | 9/1989 | Fischer ........................ 713/157 |
| 5,455,953 | A | | 10/1995 | Russell |
| 6,026,166 | A | | 2/2000 | LeBourgeois |
| 6,275,944 | B1 | | 8/2001 | Kao et al. |
| 6,334,121 | B1 | | 12/2001 | Primeaux et al. |
| 6,367,013 | B1 | | 4/2002 | Bisbee et al. |
| 6,401,206 | B1 | | 6/2002 | Khan et al. |
| 6,629,246 | B1 | | 9/2003 | Gadi |
| 6,636,975 | B1 | | 10/2003 | Khidekel et al. |
| 6,892,307 | B1 | * | 5/2005 | Wood et al. ........................ 726/8 |
| 7,076,797 | B2 | * | 7/2006 | Loveland ........................ 726/4 |
| 7,131,009 | B2 | | 10/2006 | Scheidt et al. |
| 7,150,038 | B1 | | 12/2006 | Samar |

(Continued)

FOREIGN PATENT DOCUMENTS

KR 1020070061606 A 6/2007

OTHER PUBLICATIONS

Modelling and Information Fusion in Digital Identity Management Systems by Phiri et al; Publisher: IEEE; Year: 2006.*

(Continued)

*Primary Examiner* — Madhuri Herzog
(74) *Attorney, Agent, or Firm* — Lee & Hayes, PLLC

(57) ABSTRACT

Embodiments for providing differentiated access based on authentication input attributes are disclosed. In accordance with one embodiment, a method includes receiving an authentication input at an authentication authority using an authentication protocol. The authentication input being associated with a client. The method also includes providing one or more representations for the authentication input, wherein each of the representations represents an attribute of the authentication input.

20 Claims, 9 Drawing Sheets

(56) References Cited

U.S. PATENT DOCUMENTS

| | | | |
|---|---|---|---|
| 7,152,066 | B2 | 12/2006 | Nelson et al. |
| 7,231,661 | B1 | 6/2007 | Villavicencio et al. |
| 7,845,003 | B2* | 11/2010 | Morris et al. ............... 726/8 |
| 7,949,771 | B1* | 5/2011 | Chen et al. ............... 709/229 |
| 2002/0138640 | A1 | 9/2002 | Raz et al. |
| 2003/0101348 | A1* | 5/2003 | Russo et al. ............... 713/185 |
| 2004/0039909 | A1 | 2/2004 | Cheng |
| 2004/0088543 | A1* | 5/2004 | Garg et al. ............... 713/157 |
| 2004/0117662 | A1 | 6/2004 | Ong |
| 2004/0177272 | A1* | 9/2004 | Walters ............... 713/201 |
| 2005/0066164 | A1 | 3/2005 | Simon |
| 2005/0108551 | A1 | 5/2005 | Toomey |
| 2005/0120213 | A1 | 6/2005 | Winget et al. |
| 2005/0132054 | A1 | 6/2005 | Chang et al. |
| 2005/0132220 | A1 | 6/2005 | Chang et al. |
| 2005/0228886 | A1 | 10/2005 | Cain et al. |
| 2005/0261926 | A1* | 11/2005 | Hartridge ............... 705/1 |
| 2005/0278547 | A1 | 12/2005 | Hyndman et al. |
| 2006/0020813 | A1* | 1/2006 | Birk et al. ............... 713/182 |
| 2006/0095763 | A1 | 5/2006 | Iyengar et al. |
| 2007/0006299 | A1 | 1/2007 | Elbury et al. |
| 2007/0016782 | A1 | 1/2007 | Crall et al. |
| 2007/0055887 | A1 | 3/2007 | Cross et al. |
| 2007/0136603 | A1* | 6/2007 | Kuecuekyan ............... 713/185 |
| 2008/0034219 | A1 | 2/2008 | Ting |
| 2008/0072311 | A1* | 3/2008 | Mullick et al. ............... 726/15 |
| 2008/0086731 | A1 | 4/2008 | Trossman et al. |
| 2008/0201382 | A1 | 8/2008 | Zagorski |
| 2008/0222719 | A1 | 9/2008 | Chang et al. |
| 2009/0178129 | A1 | 7/2009 | Cross et al. |

OTHER PUBLICATIONS

"CA Certificate Policy for Cybertrust Certification Services", found at <<http://cybertrust.omniroot.com/repository/Cybertrust%20CP%20v.2.3_cl.pdf>>, Sep. 11, 2007, 50 pgs.

Chokhani, "Internet X.509 Public Key Infrastructure Certificate Policy and Certification Practices Framework", found at <<http://www.ietf.org/rfc/rfc2527.txt>>, The Internet Society, Mar. 1999, 43 pgs.

"PKI Model Certificate Policy", found at <<http://www.ec3.org/Downloads/2001/PKI_Model_ED.pdf>>, NECCC E-Sign Interoperability Work Group, Dec. 2001, 49 pgs.

PCT International Search Report and Written Opinion for PCT Application No. PCT/US2008/086047 mailed on Jun. 29, 2009, 10 pgs.

Dubin, "Traditional Single Sign-On (SSO) Products vs Federated Identities", retrieved on Apr. 23, 2008 at <<http://searchsecurity.techtarget.com/expert/KnowledgebaseAnswer/0,289625,sid14_gci1279100,00.html>>, SearchSecurity.com, Sep. 2, 2007, pp. 1-3.

Jonsson, "A Single Passport: The Power, Promise-and Perils-of Federated Identity", retrieved on Apr. 23, 2008 at <<http://www.rsa.com/newsletter/Vantage/Spring2004/single_passport.html>>, RSA Vantage Magazine, vol. 1, No. 2, 2004, pp. 1-5.

Patterson, et al., "Federated Identity: Single Sign-On Among Enterprises", retrieved on Apr. 23, 2008 at http://developers.sun.com/identity/reference/techart/federated.html, Sun Microsystems, Oct. 14, 2004, pp. 1-9.

Stallings, "Understanding Federated Identity", retrieved on Apr. 23, 2008 at <<http://www.networkworld.com/news/tech/2007/090307techupdate.html?page=1>>, Network World, Aug. 31, 2007, pp. 1-5.

U.S. Appl. No. 12/176,009, filed Jul. 18, 2008, Thomas C. Jones, Differentiated Authentication for Compartmentalized Computing Resources, 55 pgs.

Final Office Action for U.S. Appl. No. 12/176,009, mailed on Aug. 3, 2011, Thomas Jones, "Differentiated Authentication for Compartmentalized Computing Resources", 30 pages.

Translated Chinese Office Action mailed Aug. 1, 2012 for Chinese patent application No. 200880124249.6, a counterpart foreign application of U.S. Appl. No. 11/969,456, 12 pages.

Chinese Office Action mailed Mar. 25, 2013 for Chinese patent application No. 200880124249.6, a counterpart foreign application of U.S. Appl. No. 11/969,456, 13 pages.

\* cited by examiner

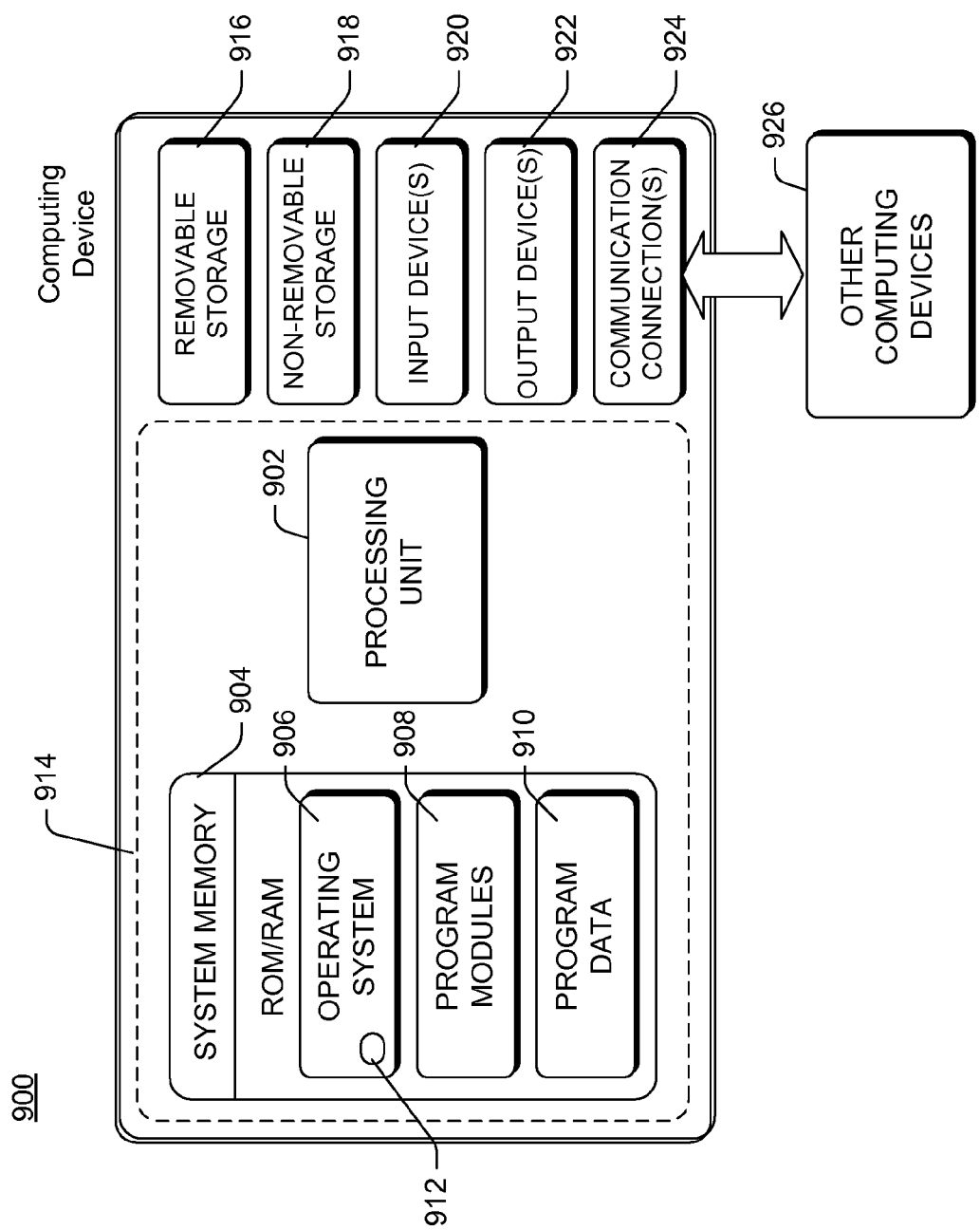

SELECTIVE AUTHORIZATION BASED ON AUTHENTICATION INPUT ATTRIBUTES

BACKGROUND

As valuable or sensitive networked resources are being made accessible over computer networks in ever greater frequency, there is an equally increasing need to selectively control networked access to these resources, including applications, data, and services. Access to less sensitive or valuable networked resources may be sufficiently controlled based on logon identities and passwords. However, other networked resources may require enhanced protection provided by more complex authentication methods and systems. For example, a user desiring access to a web-based resource may currently supply a specially issued web browser "cookie" in addition to a logon identity and password.

However, at the present time, there are no sophisticated end-to-end solutions that provide differentiated access to networked resources based on authentication input attributes such as the strength of the input, the type of the input, and the amount of trust placed in a user identity presented in the input. The type of the authentication input is the nature of the input (e.g., password, biometric data, identity certificate, etc). Further, in an example where the authentication input is a password, the strength may refer to character length of the password. Lastly, the amount of trust placed in a user identity presented in the authentication input may be related to the strictness of the administrative rules under which the authentication input is obtained.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for implementing selective access to networked resources based on authentication input attributes. In one embodiment, a method includes receiving an authentication input at an authentication authority using an authentication protocol. The authentication input being associated with a client. The method also includes providing one or more representations for the authentication input, wherein each of the representations represents an attribute of the authentication input.

In an additional embodiment, the method may further include receiving an access request from a client at a server, the access request including the one or more representations of the authentication input. The method also includes comparing the one or more representations against an authorization policy accessible to the server. If the one or more representations meet requirements of the authorization policy, the method also includes granting access to a resource.

In another embodiment, a computer readable medium having computer-executable instructions that, when executed, perform acts that comprise receiving an authentication input at an authentication authority using an authentication protocol. The authentication input being associated with a client. The acts also include validating the authentication input at the authentication authority. Moreover, the acts include returning a token to the client using the authentication protocol. The token includes representations created from the validated authentication input.

In a further embodiment, a system for providing selective access to networked recourses comprises one or more processors. The system also comprises memory to store a plurality of computer-executable instructions for execution by the one or more processors. The computer-executable instructions comprise instructions for receiving an authentication input at an authentication authority using an authentication protocol. The authentication input being associated with a client. The computer-executable instructions also comprise instructions for providing one or more representations for the authentication input, wherein each of the representations represents an attribute of the authentication input.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 9 is a block diagram illustrating a representative computing device. The representative device may be a part of the network environment show in FIG. 1.

DETAILED DESCRIPTION

This disclosure is directed to embodiments that facilitate differentiated access to networked resources based on the attributes of authentication inputs. Specifically, the embodiments described herein are directed to providing representations based on the authentication input attributes associated with the authentication request, wherein some of the representations may be included in tokens. The representations may be tailored to provide different access permissions as a function of the authentication input attributes. The representations are then used to gain differentiated access to networked resources on a target server. In this way, embodiments of the present disclosure provide differentiated access to resources so that productivity may be enhanced while protection for valuable or sensitive networked resources is simultaneously increased. Various examples of facilitating differentiated access to networked resources based on the attributes of authentication inputs are described below with reference to FIGS. 1-9.

Exemplary System Architecture

Figure 1:
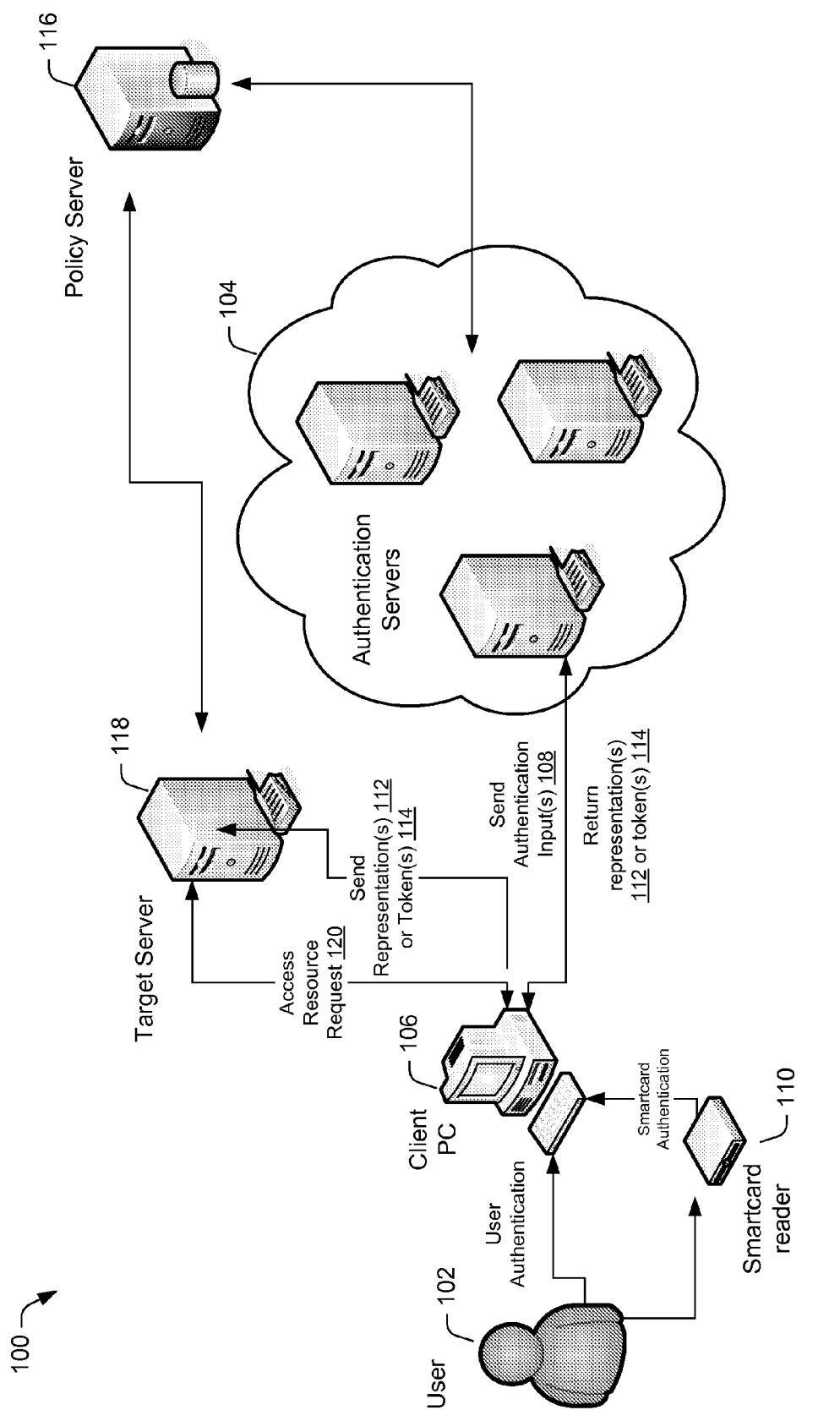
FIG. 1 is a block diagram illustrating an exemplary network environment on which selective access to networked resources are implemented.

FIG. 1 illustrates an exemplary network environment 100 that provides networked resources based on user authentication input attributes. The network environment 100 enables a user 102 to authenticate the user's identity to an authentication server 104, or alternatively, a plurality of authentication servers 104, via a client terminal 106. The network environment 100 may include at least one of a wide-area network (WAN), a local area network (LAN), and the like. The authentication servers 104 may control access to the entire network or alternatively, control access to a particular domain on the network. In various instances, the authentication server 104 may include domain controllers. In one instance, the domain controllers may include a Kerberos Key Distribution Center (KDC) of a MICROSOFT WINDOWS® network.

In one instance, the user 102 may authenticate the user's identity to the authentication server 104 by entering an authentication input 108 in the form of a logon identity and a password. In other instances, the user 102 may authenticate to the authentication server 104 via an identity certificate that is issued to the user 102. For example, in some embodiments, the identity certificate may be in the form of software data stored in a computer-readable storage media. In other embodiments, the identity certificate may take the form of a hardware certificate that is stored as an algorithm that is hardwired into an integrated circuit card (ICC), also known as smart card. Accordingly, in some instances where smart card authentication is implemented, the user 102 may authenticate the user's identity to the authentication server 104 by presenting a smart card hardware certificate, as well as one or more associated cryptographic keys, to a smart card reader 110. The smart card reader 110 is interactively linked to the client terminal 106. Nevertheless, it will be appreciated that in alternative instances, the identity certificates and/or one or more cryptographic keys, may be further stored in other computer-readable media, including flash drives, radio-frequency identification (RFID) tags, as well as other portable data storage devices.

In other instances, the user 102 may also authenticate the user's identity to the authentication server 104 using authentication inputs 108 in the form of biometrics (e.g., fingerprints, palm prints, retinal patterns, etc.), as well as other similar methods. Moreover, the user 102 may authenticate the user's identity to the authentication server 104 via a variety of authentication protocols. These authentication protocols may include a NT LAN Manager (NTLM) protocol, a Kerberos protocol, a Web Services (WS)-security protocol, a Public Key Cryptography for Initial Authentication in Kerberos (PKINIT) protocol, a Secure Sockets Layer (SSL) protocol, and a Transport Layer Security (TLS) protocol.

The authentication server 104 is configured to verify the authentication input 108 provided by the user 102. The authentication server 104 may be connected to rest of the network environment 100 via one of a wired connection (e.g., LAN, WAN) or a wireless connection (e.g., cellular, WiFi, Ultrawideband). In turn, the authentication server 104 may generate representations 112 based on the authentication inputs provided by users, such as the user 102. Each of the generated representations 112 may represent one or more attributes of the authentication input. Specifically, the represented authentication input attributes may include, for example, the strength of the input, the type of the input, and the amount of trust in the user identity presented in an authentication input. According the various embodiments, the authentication server 104 may be further configured to form tokens 114, wherein each of the tokens 114 includes one or more generated representations 112. In some exemplary embodiments, the generated tokens 114 include Kerberos ticket granting tickets (TGTs).

The type of the authentication input 108 is the nature of the input (e.g., password, biometric data, identity certificate, etc). For example, the authentication input may be a user logon and password combination, an identity certificate embodied in a smart card, or a biometric input. Further, the strength of the authentication input 108 refers to the resistance of the authentication input to tampering or circumvention. Typically, but certainly not exclusively, the strength of an authentication input 108 is measured and compared in a quantitative manner. For example, a 10-character password may have greater strength (entropy) than a 5-character password.

The amount of trust placed in a user identity presented in the authentication input 108 may be related to the strictness of the administrative rules under which the authentication input 108 is obtained. For example, a first type of identity certificate (authentication input 108) that enables access to limited networked resources may simply be issued in response to an email certificate request. Alternatively, other types of digital certification, which enable access to wider arrays of networked resources, may be issued in response to certificate requests only after mandatory in-person identification verifications. Other types of identity certificates may be issued only after an extensive background check. These last types of identity certificates may allow the respective holders of the certificates to access networked resources or perform other tasks that are not permitted with the former types of identity certificates.

In one or more exemplary embodiments where the network environment 100 includes a WINDOWS SERVER® network, the amount of trust in the user identity in an identity certificate, also known as a level of assurance, may be defined by issuance policies. In other words, an issuance policy is one or more administrative rules that are implemented for the issuance of an identity certificate. In one implementation, the issuance policies may be stored on a policy server 116. Accordingly, the authentication server may be configured to access the policy server 116 to retrieve the issuance policies. However, it will be appreciated that in other embodiments, at least some of the issuance policies may be stored directly on the authentication server 104. Issuance policies, as well the association of an issuance policy with a particular issued identity certificate, are further explained with respect to FIG. 2.

Figure 2:
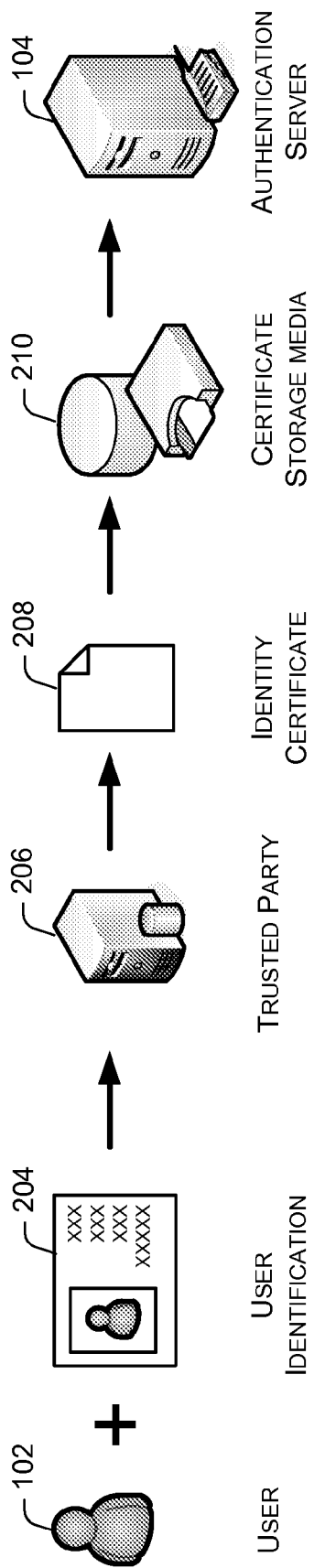
FIG. 2 is a block diagram illustrating an exemplary hardware identity certificate generation process, as implemented on the network environment shown in FIG. 1.

FIG. 2 is a block diagram illustration an exemplary identity certificate generation process 200 for issuing identity certificates with different levels of assurance, in accordance with at least one embodiment of selective authorization based on authentication input attributes. The generation process 200 may be initiated when a user 102 provides a certificate request, along with user identification 204, to a trusted party 206. The user identification 204 may be any documentation or characteristic which serves to verify the identity of the user 102. For example, the user identification 204 may be a government-issued photographic identification, an employer-issued identification, a pre-stored biometric characteristic, or other similar documentation or characteristic. The trusted party 206 is a third party that facilitates interactions between two parties that both trust the third party (e.g., user 102 and a second party). In this instance, the second party is the network environment 100, as controlled by the authentication server 104 (FIG. 1).

The trusted party 206 may also be referred to as a certificate authority (CA). In various instances, the trusted party 206 may processes each certificate request by pre-established administrative rules, or issuance policies. Put another way, the issuance policies dictates the identification verification procedures that the certificate authority (CA) performs before issuing a specific type of identity certificate. In some embodiments, the identification verification procedures dictated by the issuance policies may be dependent upon the nature of the user 102, and/or the intended use of the certificate.

Accordingly, the trusted party 206 may issue some types of identity certificates with no proof of identification. However, other types identity certificates may be issued by the trusted party 204 after users 102 have met required proof requirements. For example, an issuance policy may dictate that the trusted party 206 issue the first type of identity certificate only after an in-person identification verification meeting where an employee provides user identification documentation, such as the user identification 204. This first type of certificate enables the employee to access sensitive employer-owned networked resources. However, an issuance policy may provide that the second type of certificate may be issued in response to an email request without additional security requirement, as the second type of certificate only allows a customer limited access to a purchasing web site.

An issued identity certificate may store information regarding the issuance policy under which it is issued. For example, in an instance where a network environment 100 (FIG. 1) is a WINDOWS SERVER® network environment, the WINDOWS SERVER® network environment may include four predefined issuance policies: (1) all issuance; (2) low assurance; (3) medium assurance; and (4) high assurance. Each of the four issuance policies is represented in identity certificates by a corresponding object identifier (OID) that is defined at the certification authority (CA). The object identifiers (OIDs) are then included in the respective issued certificates. Thus, when a user 102 presents an identity certificate, the identity certificate may be examined to verify the issuance policy and determine if that level of issuance policy is sufficient to perform the requested action.

According to various embodiments, the "all issuance" policy contains all other issuance policies. The "all assurance" policy may be represented by the object identifier (OID) "2.5.29.32.0". The "low assurance" policy permits certificates to be issued with no security requirements. The "low assurance" policy may be represented in an identity certificate by the object identifier (OID) "1.3.6.1.4.1.311.21.8.x.y.z.1.400", wherein the x.y.z portion of the object identifier is a randomly generated numeric sequence that is unique for each WINDOWS SERVER® forest.

Furthermore, the "medium assurance" object identifier (OID) may represent identity certificates that have additional security requirements for issuance. For example, a smart card certificate that is issued in a face-to-face meeting with a smart card issuer (trusted party 206) may be considered a "medium assurance" certificate and contain the medium assurance object identifier. An exemplary "medium assurance" object identifier (OID) is "1.3.6.1.4.1.311.21.8.x.y.z.1.401", wherein the x.y.z portion of the object identifier is a randomly generated numeric sequence that is unique for each WINDOWS SERVER® forest.

Additionally, the "high assurance object identifier" is used to represent certificates that are issued with the highest security. For instance, the issuance of a key recovery agent certificate may require additional background checks and a digital signature from a designated approver. This is due to the fact that a user 102 holding this certificate is capable of recovering private key material from a WINDOWS SERVER® network. An exemplary "high assurance" object identifier (OID) is "1.3.6.1.4.1.311.21.8.x.y.z.1.402", wherein the x.y.z portion of the object identifier is a randomly generated numeric sequence that is unique for each WINDOWS SERVER® forest.

Nevertheless, it will be further appreciated that other object identifiers (OIDs) may be created to represent custom issuance policies. For example, two organizations involved in a purchaser/seller relationship can define custom object identifiers (OIDs) to represent identity certificates for specific purchase amounts. Applications can then use these object identifiers (OIDs) to recognize whether a purchaser has the appropriate signing authority for a specific volume purchase.

While some identity certificates 208 may be in the form of software data stored in computer-readable storage media, other identity certificates 208 may take the form of hardware certificates that are hardwired into integrated circuit cards (ICCs), also known as smart cards. These cards are represented by certificate storage media 210. As further described below, an identity certificate 208 may be further submitted to an authentication server 104 as an authentication input so that one or more corresponding representations may be generated.

Returning to FIG. 1, the authentication server 104 may generate representations 112 based on the authentication inputs 108 provided by users, such as the user 102. The generated representations 112 represent one or more attributes of the authentication input. Specifically, the represented authentication input attributes may include the strength of the authentication input 108, the type of the authentication input 108, and the amount of trust in the user identity presented in an authentication input 108. The corresponding representation 112 may be in the form of an object identifier (OID), a globally unique identifier (GUID), a security identifier (SID), or a strong representation. According to some embodiments, the correspond representations 112 are formatted using one of an Abstract Syntax Notation number One (ASN.1), an Extensible Markup Language (XML), or eXtensible rights Markup Language (XrML).

In embodiments where the authentication inputs are identity certificates, the authentication server 104 may modify the identity certificates to store the representations 112 in generated tokens 114. In embodiments where the generated tokens 114 are Kerberos ticket granting tickets (TGTs), the authentication server 104 may store the representations 112 as part of the Privilege Attribute Certificate (PACs) of the (TGTs). Moreover, the authentication server 104 may forward the Kerberos TGTs to a server that the user 102 intends to access, such as target server 118. The target server 118 may be a Windows® operating system-based target server. Nonetheless, it will be further appreciated that in additional embodiments, the representations 112 may also be stored in other forms of tokens 114, including authorization tokens, service tokens, or Security Assertion Markup Language (SAML) tokens.

With continued reference to FIG. 1, the user 102 may use one or more generated representations 112, which may be included in tokens 114, to access one or more networked resources on the target server 118. In one instance, the user 102 may submit a resource access request 120, along with one or more representations 112, to the target server 118. As described herein, a network resource is any resource provided by one or more computing devices in a computing environment. For instance, networked resources may include an operating system, a mail server, a file store, a web server, a gateway server, an application program, a messaging application, a collaboration application, a calendar application, a print service, and virtually any other type of computing data, device, or service. For instance, networked resources may be any application, data, or service stored on the target server 118.

In turn, the target server 118 validates the one or more representations 112 using an authorization policy. As described above, the representations 112 may be included in tokens 114. In various embodiments, the target server 118 may compare the representations against an authorization policy that is stored within the server. Alternatively, the target server 118 may validate the representations 112 against an authorization policy that the target server 118 accesses from a policy server 116.

In one embodiment, if the one or more representations 112 indicate that the user 102 is permitted to access the one or more desired networked resources and/or perform certain tasks on the target server 118, the user 102 is given rights to perform the tasks and/or granted access to those networked resources. On the other hand, if the representations 112 do not permit the user 102 to access the desired networked resources, the user is denied rights and/or access. The target server 118 may relay the access/permission decision, that is, the grant or denial of access/permission, to the user 102 via the client terminal 106.

Figure 3:
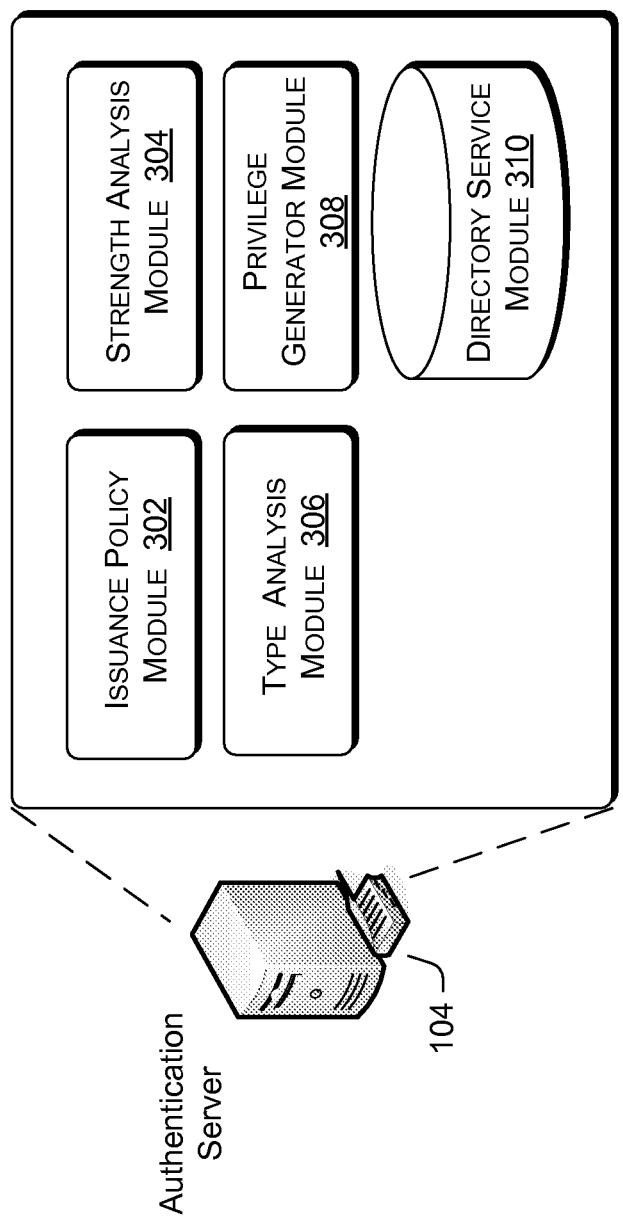
FIG. 3 is a block diagram illustrating selected components of an exemplary authentication server that is configured to provide representations, as implemented on the network environment shown in FIG. 1.

FIG. 3 illustrates selected components of an exemplary authentication server 104. The exemplary authentication server 104 may include computer-program instructions being executed by a computing device, such as the computing environment 900 described in FIG. 9. Program instructions, or modules, may include routines, programs, objects, components, and data structures that perform particular tasks or implement particular abstract data types. The selected components of the authentication server 104 may include an issuance policy module 302, a strength analysis module 304, a method analysis module 306, a privilege generator module 308, and a directory service module 310. In one embodiment, the directory service module 310 may include an Active Directory that is configured to provide authentication and authorization services in a Windows® environment via group policies. However, it will be appreciated that other directory services may also be used to provide policy-based authentication and authorization services. One of ordinary skill in the art will further appreciate that exemplary authentication server 104 may include other components that provide authentication services to users or other systems.

The issuance policy module 302 is configured to extract issuance policy object identifiers from an authentication input that is an identity certificate. Each issuance policy object identifier (OID) represents an issuance policy, or the level of assurance, under which the identity certificate is issued. Moreover, the issuance policy module 302 may pass the issuance policy object identifier (OID) to the privilege generator module 308. In turn, the privilege generator module 308 may generate one or more representations, such as the representations 112 described in FIG. 1. Specifically, as further described below, the privilege generator module 308 may access the directory service module 310 to provide representations that correspond to each issuance policy object identifier. In some embodiments, the privilege generator module 308 may store the one or more representations in tokens, such as the tokens 114 further described in FIG. 1. For example, in embodiments where a representation is in the form of security identifier (SID), the privilege generator module 308 may build a Kerberos ticket granting ticket (TGT) that includes the security identifier (SID) in the Privilege Attribute Certificate (PAC) of the TGT.

The strength analysis module 304 is configured to extract the strength attributes from authentication inputs. As described above, the strength of an authentication input may be defined as the resistance of the authentication input to tampering or circumvention. Typically, this resistance may be based on the permutational or cryptographical complexity of the authentication input. The strength analysis module 304 may be further configured to pass the strength attributes of authentication inputs to the privilege generator module 308. For example, the strength analysis module 304 may provide the character-length of a password to the privilege generator module 308. In another instance, the strength analysis module 304 may recognize and provide the encoding type of an identity certificate to the privilege generator 308. In turn, the privilege generator module 308 may access the directory service module 310, which may store specific representations that correspond to strength attributes, to retrieve the appropriate representations.

The method analysis module 306 is configured to identify the type attribute of authentication inputs. As described above, the type of an authentication input is the nature of the input (e.g., password, biometric data, identity certificate, etc). The type analysis module 306 may be further configured to pass the type attributes of the authentication inputs to the privilege generator module 308. For example, the type analysis module 306 may inform the privilege generator module 308 that a first authentication input has a type attribute of a password, that a second authentication input has a type attribute of a fingerprint scan, and so on and so forth. In turn, the privilege generator module 308 may access the directory service module 310, which may store a representation that correspond each type attribute, to retrieve representations that correspond to the respective type attributes.

It will be appreciated that while the directory service module 310, which provides group policies, is described as a part of the authentication server 104, the directory service module 310 may be located in other remote locations. For example, the directory service module 310 may be located in a networked policy server 116, as described with respect to the exemplary network environment 100.

Exemplary Processes

FIGS. 4-8 illustrate exemplary processes that facilitate the implementation of differentiated access to networked resources. The exemplary processes in FIGS. 4-8 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the exemplary network environment 100 of FIG. 1, although they may be implemented in other system architectures.

Figure 4:
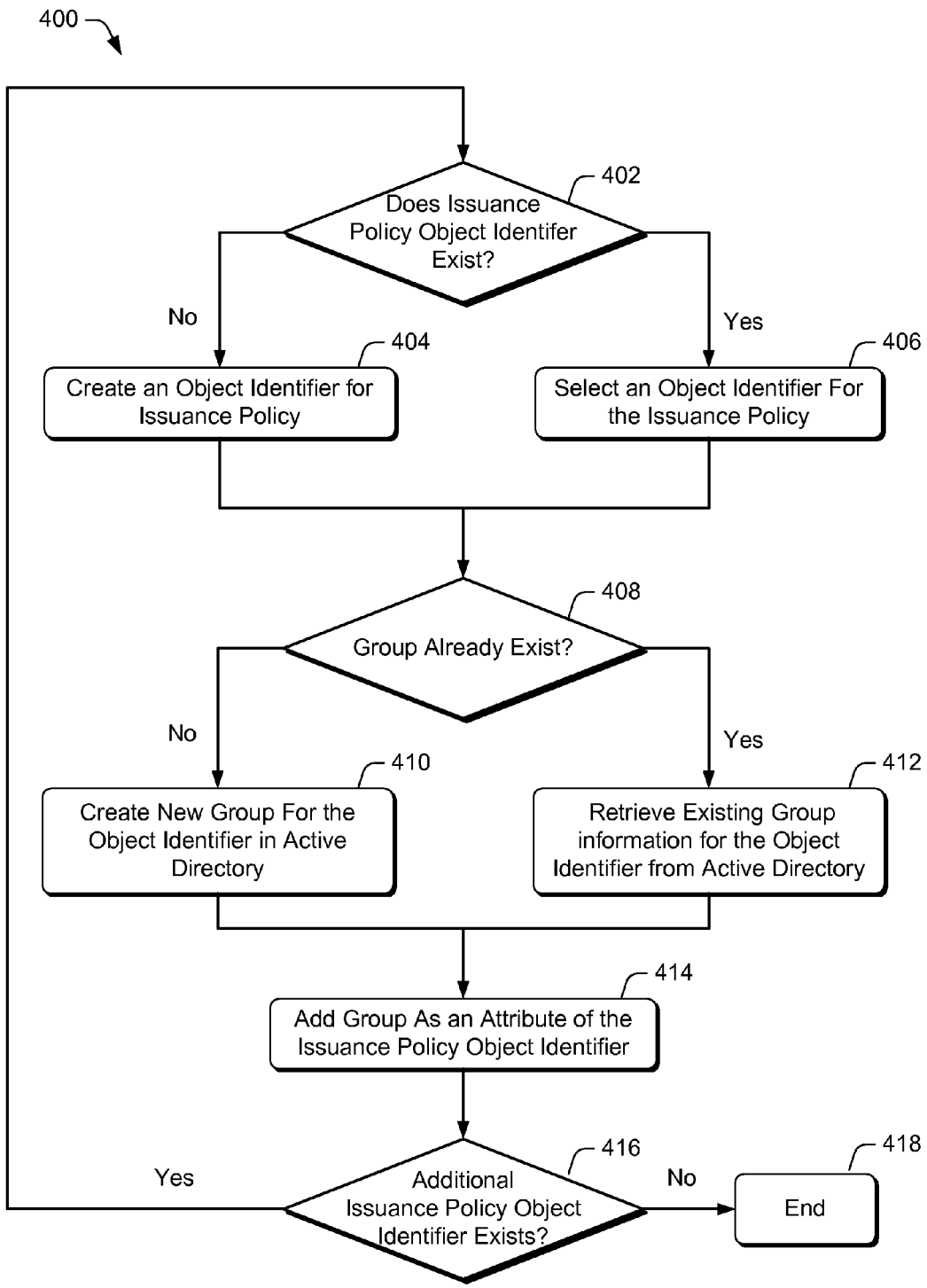
FIG. 4 is a flow diagram illustrating an exemplary process for assigning object identifiers to policy certificates, as implemented on the network environment shown in FIG. 1.

FIG. 4 is a block diagram illustrating an exemplary process 400 for assigning object identifiers to policy certificates. This exemplary process may be implemented for identity certificates that are used for differentiated access in a WINDOWS SERVER® network. At decision block 402, an identity certificate may be issued in response to a request in accordance with an issuance policy. During the issuance of the identity certificate, a certificate authority (CA), such as trusted party 202, may determine whether an issuance policy object identifier (OID) for the issuance policy exists. In one embodiment, the certificate authority (CA) may make this determination by search through an Active Directory, such as directory service module 310, for a pre-generated object identifier (OID) that corresponds to the issuance policy.

If the certificate authority (CA) determines at decision block 402 that an issuance policy does not exists, ("no" at decision block 402), the process may proceed to block 404. At block 404, the certificate authority (CA) may create an object identifier (OID) for the issue policy. At block 404, the certificate authority (CA) may store the object identifier (OID) in an Active Directory. Alternatively, if it is determined that an object identifier (OID) for the issuance policy does exist, the process 400 may proceed to block 406. At block 406, the certificate authority (CA) may select the appropriate object identifier (OID) for the issuance policy from the Active Directory and include it in the identity certificate. The inclusion of the issuance policy object identifier (OID) in the issued certificate indicates that the certificate meets the issuance requirements associated with the issuance policy.

At block 408, the certificate authority (CA) may determine whether the object identifier (OID) that was included in the identity certificate is mapped to a particular identity group. In other words, the certificate authority (CA) may determine whether the object identifier (OID) is a member of an identity group. According to various embodiments, each identity group may be governed by a group policy that defines its membership. In one embodiment, the group policy is stored in the policy server 116. The group policy may control the group members with respect to security policy for access to networked resources, as well as perform tasks that include auditing, software installation, logon/logoff scripts, folder redirection, and other tasks.

Accordingly, if the certificate authority (CA) determines that the object identifier (OID) is not mapped to an identity group ("no" at decision block 408), the process 400 may proceed to block 410. At block 410, the certificate authority (CA) may create a new identity group for the object identifier in the Active Directory. However, if it is determined that the object identifier (OID) is already mapped to an identity group ("yes" at decision block 408), the certificate authority (CA) may retrieve the existing identity group information for the object identifier (OID) from the Active Directory at block 412. At block 414, the certificate authority (CA) may add an identification of the group as an attribute to the object identifier of the issuance policy. Thus, in one embodiment, identity certificates having identical object identifiers (OIDs) may provide access to the same networked resources and the ability to perform the same tasks.

At decision block 416, the certificate authority (CA) may determine whether an additional issuance policy is applicable to the identity certificate. Such a case may occur, for example, if the identity certificate is issued under one or more issuance policies. For instance, the identity certificate may be intended for multiple purposes that are governed by different issuance policies. Accordingly, if the certificate authority (CA) determines that an additional policy is applicable to the identity certificate ("yes" at decision block 416), the process 400 may loop back to block 402, where the assignment of an object identifier to an issuance policy may be performed. However, if the certificate authority (CA) determines that no additional issuance policies are applicable ("no" at decision block 416), the process 400 may terminate at block 418.

Figure 5:
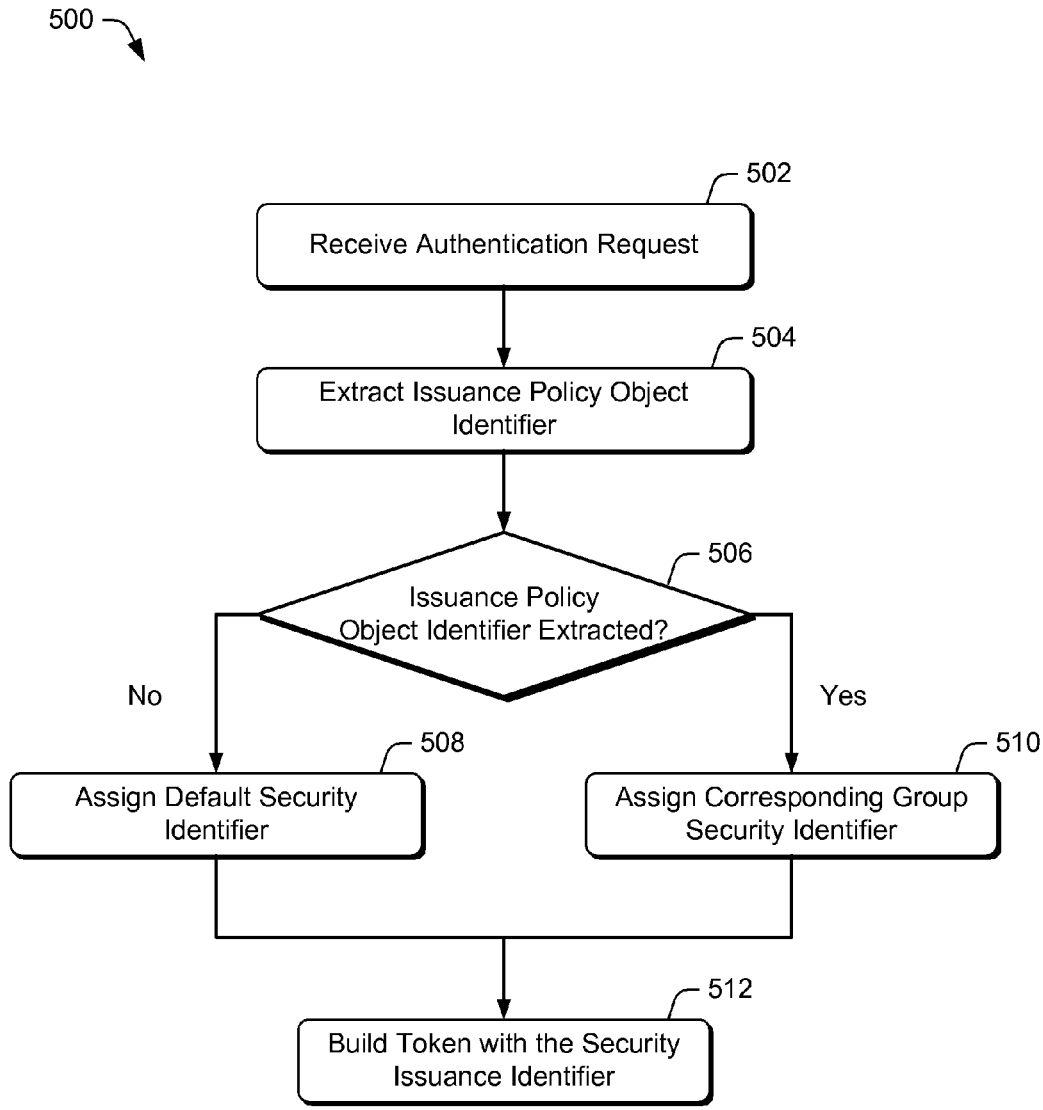
FIG. 5 is a flow diagram illustrating an exemplary process that generates a representation for an issuance policy stored in an identity certificate, as implemented on the network environment shown in FIG. 1.

FIG. 5 is a block diagram illustrating an exemplary process 500 that generates information regarding an issuance policy, in the form of representations, for an identity certificate, wherein the identity certificate is issued under the issuance policy. This exemplary process may be implemented for identity certificates that are used for differentiated access in a WINDOWS SERVER® network.

At block 502, the user 102 may initiate an authentication process using an authentication input that includes an identity certificate. For example, the user 102 may submit the authentication input to access networked resources on the target server 118. The identity certificate may be a software certificate or a hardware certificate. The authentication input may be received by authentication server 104. At block 504, the authentication server 104 may process the identity certificate to extract an issuance policy object identifier (OID). At decision block 506, the authentication server 104 may determine whether the issuance policy object identifier (OID) is extracted. If an issuance policy object is not extracted, such as due to the fact that the identity certificate was not issued under any known issuance policy, ("no" at decision block 506), the authentication server 104 may assign a default domain-relative security identifier (SID) at block 508. In one implementation, the default security identifier (SID) indicates a default of level of trust placed in a user identity presented via the identity certificate. This default level of trust may be the lowest level of trust. For example, this lowest level trust may provide considerably less access to network resource or tasks than other levels of trust.

However, if the issuance policy object identifier (OID) was successfully extracted ("yes" at decision block 506), the authentication server 104 may assign a corresponding group security identifier (SID) to the issuance policy object identifier (OID) at block 510. According to various examples, the authentication server 104 may assign a group security identifier (SID) using a number of mechanisms. These mechanisms include the creation of a static list mapping that associates the issuance policy identifier (OID) to a pre-defined security identifier (SID) in an Active Directory. Furthermore, a pre-defined security identifier (SID) may be created by using the issuance policy object identifier (OID) as a seed value for the security identifier (SID). In turn, each of the security identifiers (SIDs) may be mapped to a particular group. This mapping of security identifiers (SIDs) is similar to the mapping of the object identifiers (OID) as described in FIG. 4.

Thus, in various instances, each group of security identifiers (SIDs) may be governed by a group policy. In one embodiment, the group policy is stored in the policy server 116. The group policy may enable the target server 118 to control access to its networked resources, as well as control the performance tasks that include auditing, software installation, logon/logoff scripts, folder redirection, and other tasks, based on the security identifiers (SIDs). For example, a group policy may state that access to a particular network resource is permissible only if a security identifier (SID) indicates that an identity certificate is associated with a high level of assurance.

At block 512, the authentication server 104 may build a token, such as the token 114 described in FIG. 1, with the one or more assigned security identifiers (SIDs). In one embodiment, the authentication server 104 may create a token that includes the assigned security identifiers (SIDs) along with the associated identity certificate. For example, the authentication server 104 may build a token in the form of a Kerberos ticket granting ticket (TGT) that includes the security identifier (SID) in the Privilege Attribute Certificate (PAC) of the TGT.

Figure 6:
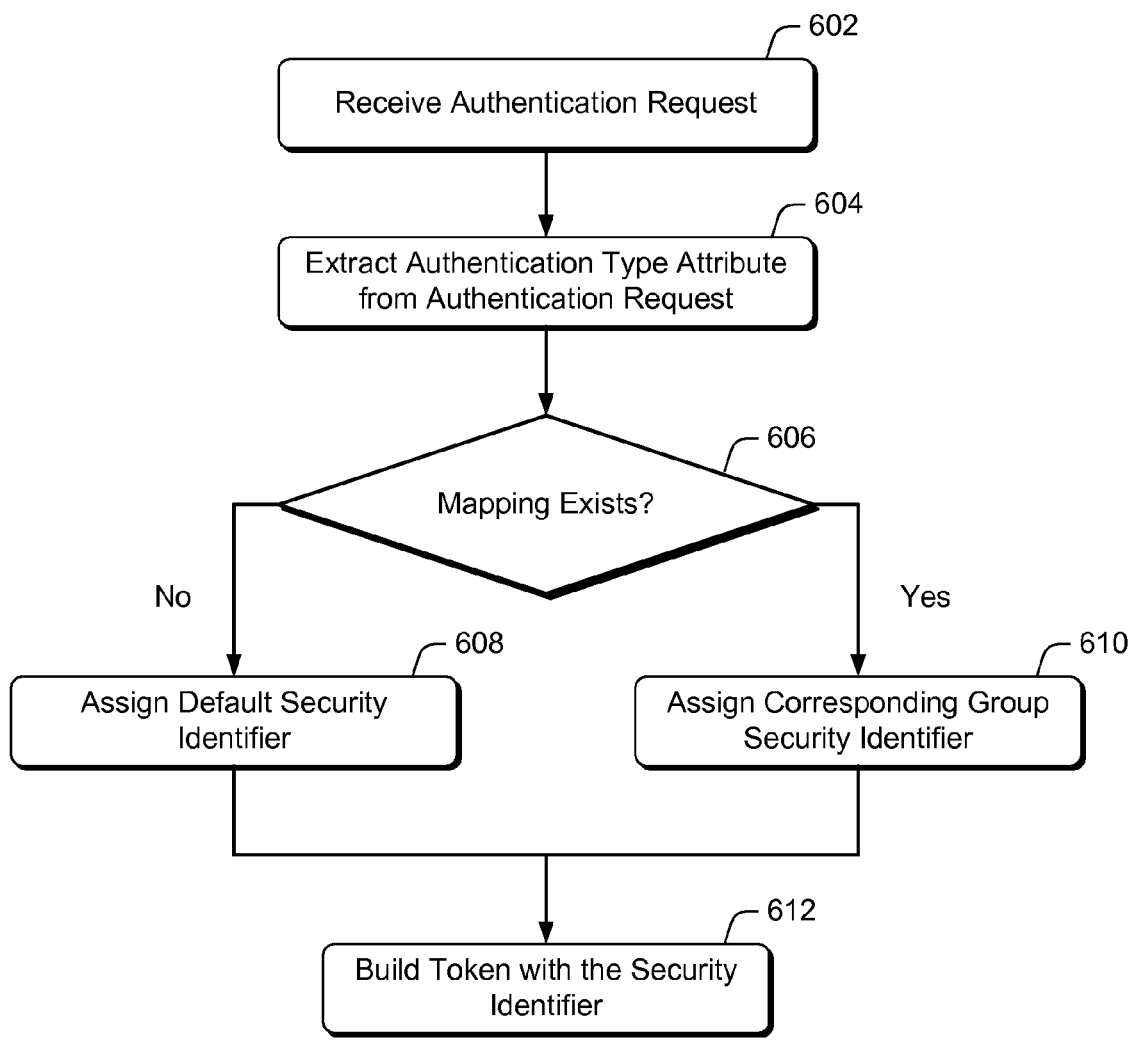
FIG. 6 is a flow diagram illustrating an exemplary process for generating a representation that represents a type attribute of an authentication input, as implemented on the network environment shown in FIG. 1.

FIG. 6 is a block diagram illustrating an exemplary process 600 for generating a representation that represent a type attribute of an authentication input. At block 602, the user 102 may initiate an authentication process using an authentication input. For example, the user 102 may submit the authentication input to access networked resources on the target server 118. The authentication input may be received by authentication server 104.

At block 604, the authentication server 104 may process the authentication input determine a type attribute of the authentication input. At decision block 606, the authentication server 104 may determine whether the type attribute of the authentication input correlates, i.e., capable of being mapped to a pre-defined security identifier (SID) that is stored in an Active Directory. According to various embodiments, the correlation between a security identifier (SID) and an authentication input type attribute may be pre-defined using a number of mechanisms. These mechanisms include the creation of a static list mapping that associates the authentication input type to a pre-defined security identifier (SID) that resides in an Active Directory. In turn, each of the security identifiers (SIDs) may be mapped to a particular group. This mapping of security identifiers (SIDs) is similar to the mapping of the object identifiers (OID) as described in FIG. 4.

Thus, in various instances, each group of security identifiers (SIDs) may be governed by a group policy. In one embodiment, the group policy is stored in the policy server 116. The group policy may enable the target server 118 to control security policy for access to its networked resources, as well as control the performance tasks that include auditing, software installation, logon/logoff scripts, folder redirection, and other tasks, based on the security identifiers (SIDs). For example, a group policy for the type attribute may state that access to a particular network resource is permissible if a security identifier (SID) indicates that the authentication input is a biometric input, but does not permit access if the authentication input is not a biometric input.

Returning to FIG. 6, if the authentication server 104 determines that the authentication input type is not associated with a pre-defined security identifier (SID), ("no" at decision 606), the process 600 may proceed to block 608. At block 608, the authentication server 104 may assign a default security identifier (SID) to the type attribute. The default security identifier (SID) may indicate a default of level of trust associated with the authentication input type. For example, this lowest level trust may provide considerably less access to network resource or tasks than other levels of trust.

However, if the authentication server 104 determines that the authentication input type is associated with a pre-defined security identifier (SID) in an Active Directory ("yes" at block 606), the process 600 may proceed to block 610. At block 610, a security identifier (SID) that corresponds to the authentication input type may be retrieved from the Active Directory and assigned to the type attribute. At block 612, the authentication server 104 may build a token, such as the token 114 described in FIG. 1, with the one or more assigned security identifiers (SIDs).

Figure 7:
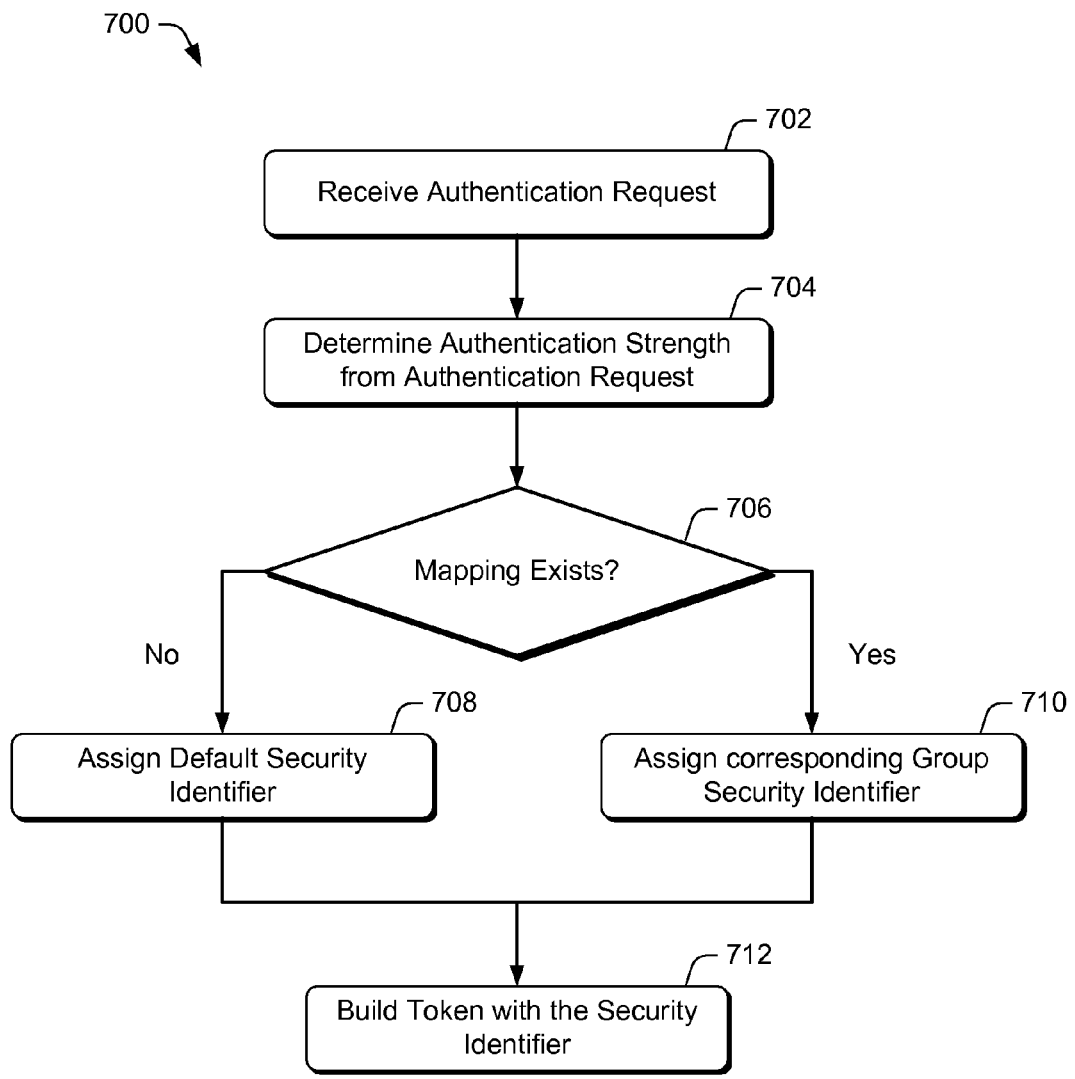
FIG. 7 is a flow diagram illustrating an exemplary process that generates a representation that represents a type attribute of an authentication input, as implemented on the network environment shown in FIG. 1.

FIG. 7 is a block diagram illustrating an exemplary process that generates a representation that represent a type attribute of an authentication input. At block 702, the user 102 may initiate an authentication process using an authentication input. For example, the 102 may submit the authentication input to access networked resources on the target server 118. The authentication input may be received by authentication server 104.

At block 704, the authentication server 104 may process the authentication input determine a strength attribute of the authentication input. At decision block 706, the authentication server 104 may determine whether the strength attribute of the authentication input is mapped, that is, associated with a pre-defined security identifier (SID) that is stored in an Active Directory. According to various embodiments, the correlation between a security identifier (SID) and an authentication input strength attribute may be pre-defined using a number of mechanisms. These mechanisms include the creation of a static list mapping that associates the authentication input type to a pre-defined security identifier (SID) that resides in an Active Directory. In turn, each of the security identifiers (SIDs) may be mapped to a particular group. This mapping of security identifiers (SIDs) is similar to the mapping of the object identifiers (OID) as described in FIG. 4.

Thus, in various instances, each group of security identifiers (SIDs) may be governed by a group policy. In one embodiment, the group policy is stored in the policy server 116. The group policy may enable the target server 118 to control security policy for access to its networked resources, as well as control the performance tasks that include auditing, software installation, logon/logoff scripts, folder redirection, and other tasks, based on the security identifiers (SIDs). For example, a group policy for the strength attribute may state that access to a particular network resource is permissible if a security identifier (SID) indicates that the authentication input is a password of 10-character length, but does not permit access if the authentication input is a password of less than 10-character length.

Returning to FIG. 7, if the authentication server 104 determines that the authentication input strength attribute is not capable of being associated with a pre-defined security identifier (SID), ("no" at decision 706), the process 700 may proceed to block 708. At block 708, the authentication server 104 may assign a default security identifier to the security identifier (SID). The default security identifier (SID) may indicate a default of level of trust associated with the authentication input strength. For example, this lowest level trust may provide considerably less access to network resource or tasks than other levels of trust.

However, if the authentication server 104 determines that the authentication input strength attribute is capable of being associated with a pre-defined security identifier (SID) in an Active Directory ("yes" at block 706), the process 700 may proceed to block 708. At block 708, a security identifier (SID) that corresponds to the authentication input strength attribute may be retrieved from the Active Directory and assigned to the strength attribute.

At block 710, the authentication server 104 may build a token, such as the token 114 described in FIG. 1, with the one or more assigned security identifiers (SIDs). In other words, the security identifiers (SIDs) are associated with the identity certificate. In one embodiment, the authentication server 104 may modify the identity certificate to store a token that includes the assigned security identifiers (SIDs).

It will be appreciated that the various security identifiers (SIDs) described in FIGS. 5-7 may be also be referred to as representations, such as the representations 112 described in FIG. 1. The representations may enable a user, such as the user 102, to access the one or more desired networked resources and/or perform certain tasks on a target server, such as the target server 118. For example, a server administrator may configure one or more access control settings that correlate the network resource on a server, such as target server 118, to the various security identifiers (SIDs) that reflect the level of assurance associated with the identity certificate.

Furthermore, in additional to security identifiers (SID), representations may be constructed from other forms of data representations in alterative embodiments. In these embodiments, the representations may also be represented by object identifiers (OIDs), globally unique identifiers (GUIDs), or strong representations.

While each authentication attribute (e.g., issuance policy, strength, and type) have been described as governed by a separate group policy. It will be appreciated that in other embodiments, the sets of policies may be combined via logical operators to determine the permissibility of access to networked resources and/or performance of tasks on a target server based on a plurality of authentication input attributes. For instance, multiple policies may be combined via logical operator functions so that networked resources on a target server may only be accessible if the authentication input is an identity certificate and the security identifier (SID) stored in the identity certificate indicates that it was issued under an issuance policy of at least medium assurance.

Figure 8:
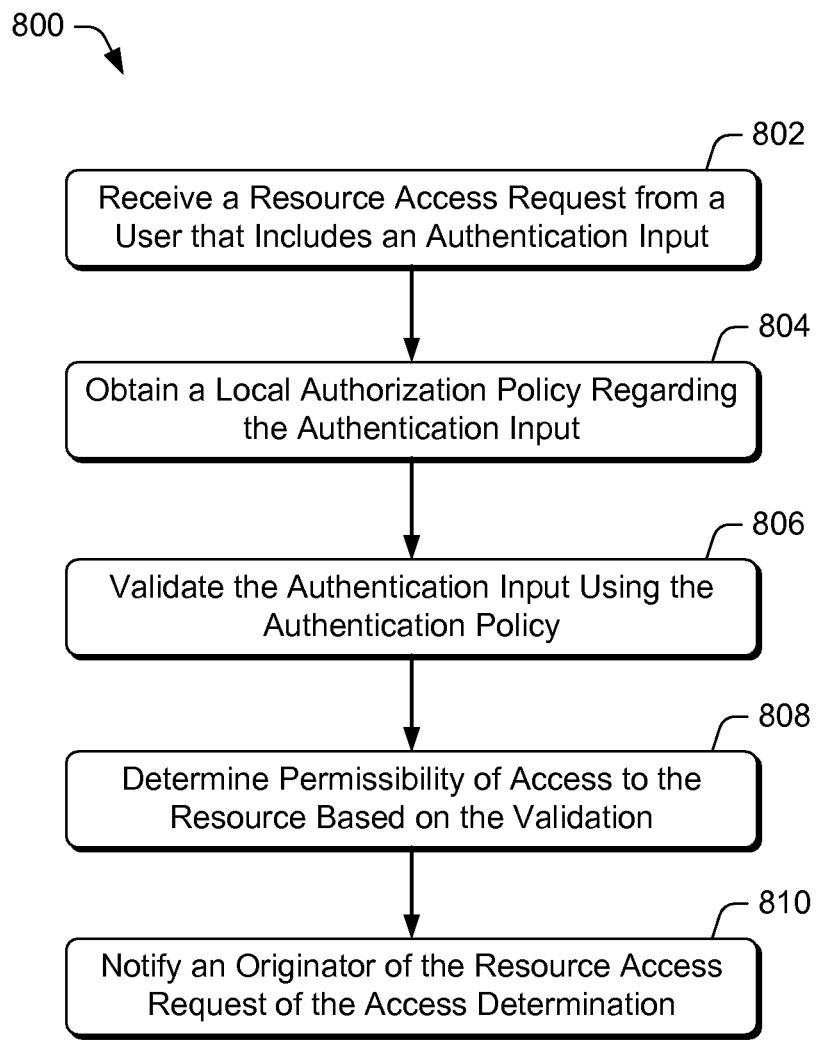
FIG. 8 is a flow diagram illustrating an exemplary process for the use of generated representations to access networked resources, as implemented on the network environment shown in FIG. 1.

FIG. 8 is a block diagram illustrating an exemplary process 800 for the use of generated representations, which may be included in tokens, to access networked resources. The generated representations may include the representations 112, and the tokens may include the tokens 114. At block 802, a target server, such as the target server 118, may receiver a resource access request from a user, such as user 102, that includes an authentication input. In one embodiment, the authentication input is transmitted via an authentication protocol that includes one a NT LAN Manager (NTLM) protocol, a Kerberos protocol, a Web Services (WS)-security protocol, a Public Key Cryptography for Initial Authentication in Kerberos (PKINIT) protocol, a Secure Sockets Layer (SSL) protocol, or a Transport Layer Security (TLS) protocol. In one embodiment, the user 102 may submit a resource access request via the client terminal 106, as shown in FIG. 1. As used herein, a resource access request refers to a request to access one or more networked resources on a target server and/or a request to perform one or more tasks on a target server, such as target server 118.

As describe above, the authentication input includes at least one of a password, a biometric characteristic, and an identity certificate. However, it will be appreciated that other forms of identity validation data may also be received from the user, provided that the identity validation data includes attributes such as type and strength, or contain some information regarding an issuance policy under which the identity validation data is assigned to the user.

In embodiments where the authentication input is an identity certificate, the target server 118 may obtain the authentication input attributes stored in the certificate. In other instances, the target server 118 may request attributes of the authentication input from the authentication server 104. In turn, the authentication server 104 may forward the one or more attributes of the authentication input to the target server 118.

In alternative embodiments, the user 102 may login by providing an authentication input to a middle-tier server. In one embodiment, a middle-tier server is a server that resides between the user client terminal, such as client terminal 106, and the data management server, such as the target server 118. The middle-tier server may be configured to forward the authentication input to a target server. The forward of the authentication input may be performed using various mechanisms, including Kerberos delegation and Service-for-User-to-Proxy (S4U2proxy). In these instances, attributes of the authentication input, such as issuance policy information is also carried forward from the middle-tier server to the target server.

At block 804, the target server 118 may obtain a local authorization policy that includes group policies for the attributes of authentication inputs. In one embodiment, the group policies in the authorization policy may be formatted in one of an Abstract Syntax Notation number One (ASN.1), an Extensible Markup Language (XML), or an eXtensible rights Markup Language (XrML). The authentication input attributes include the issuance policy under which an identity certificate is issued, as well as the strength and type of the authentication inputs. The group policies govern networked resource access on the target server 118, as well as control the performance tasks that include auditing, software installation, logon/logoff scripts, folder redirection, and other tasks, on the target server 118. In one embodiment, the local authorization policy is stored in an Active Directory on the target server 118.

At block 806, the target server 118 may validate the authentication input using the authentication policy. According to various embodiments, the validation may be carried out by one of an application, an operating system, a resource manager, or an authorization system on the target server 118. Specifically, the target server 118 may obtain one or more representations that represent corresponding authentication input attributes. The one or more representations may be stored in a token. Furthermore, the target server 118 may compare the representations to one or more group policies to determine a list of networked resources and tasks are accessible to the user 102. The one or more group policies may be stored on the target server 118 or, alternatively, on the policy server 116. At block 808, the target server 118 may determine permissibility of access to the resource (i.e., network resource and/or tasks) by the user 102. Specifically, the target server 118 may compare the particular networked resources and task in the resource access request to the list of accessible networked resources and tasks. Thus, a determination is made as to whether the user may access the resource.

At block 810, the user 102 is notified of the determination of the target server 118 with regards to the permissibility of the access to the resource. According to various embodiments, the target server 102 may be configured to present a notification on a user interface of a remote terminal, such client terminal used by the user 102.

Exemplary Computing Environment

FIG. 9 illustrates a representative computing device 900 that may be used to implement the selective networked resource access techniques and mechanisms described herein. For example, the authentication server 104 (FIG. 1) may be implemented on the representative computing device 900. However, it will readily appreciate that the various embodiments of the selective networked resource techniques and mechanisms may be implemented in other computing devices, systems, and environments. The computing device 900 shown in FIG. 9 is only one example of a computing device and is not intended to suggest any limitation as to the scope of use or functionality of the computer and network architectures. Neither should the computing device 900 be interpreted as having any dependency or requirement relating to any one or combination of components illustrated in the example computing device.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 906, one or more program modules 908, and may include program data 910. The operating system 906 include a component-based framework 912 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 900 is of a very basic configuration demarcated by a dashed line 914. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 916 and non-removable storage 918. Computer storage media may include volatile and nonvolatile, removable and non-removable media implemented in any method or technology for storage of information, such as computer readable instructions, data structures, program modules, or other data. System memory 904, removable storage 916 and non-removable storage 918 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 920 such as keyboard, mouse, pen, voice input device, touch input device, etc. Output device(s) 922 such as a display, speakers, printer, etc. may also be included. These devices are well know in the art and are not discussed at length here.

Computing device 900 may also contain communication connections 924 that allow the device to communicate with other computing devices 926, such as over a network. These networks may include wired networks as well as wireless networks. Communication connections 924 are one example of communication media. Communication media may typically be embodied by computer readable instructions, data structures, program modules, etc.

It is appreciated that the illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The provision of differentiated access to networked resources based the attributes of the authentication inputs may enhance security. This enhanced security may be especially important for the protection of high end, valuable, expensive or sensitive resources, applications or data. Thus, embodiments in accordance with this disclosure may serve to ensure that only the intended authorized and properly authenticated entities access these resources.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-implemented method, comprising:
    issuing an authentication input according to an issuance policy, the issuance policy dictating one or more identification verification procedures that are performed prior to the issuing the authentication input;
    receiving the authentication input provided by a client device at an authentication authority using an authentication protocol;
    identifying a strength attribute of the authentication input that represents a permutational complexity or a cryptographic complexity of the authentication input;
    identifying an amount of trust in the authentication input, the amount of trust corresponding to a strictness of administrative rules under which the authentication input was issued;
    representing the strength attribute of the authentication input, the amount of trust in the authentication input, and an identifier of the issuance policy with one or more representations; and
    returning a token to the client device that includes the one or more representations using the authentication protocol.

2. The computer-implemented method of claim 1, further comprising:
    receiving an access request from the client device at a server, the access request including the token having the one or more representations;
    comparing the one or more representations against an authorization policy accessible to the server; and
    granting access to a resource if the one or more representations meet requirements of the authorization policy.

3. The computer-implemented method of claim 1, wherein the authentication input is a password or an identity certificate.

4. The computer-implemented method of claim 3, wherein the authentication authority includes a Kerberos Key Distribution Center (KDC) in a Windows-based network and the token includes a Kerberos ticket granting ticket (TGT), and wherein the one or more representations are contained in a Privilege Attribute Certificate (PAC) of the Kerberos TGT.

5. The computer-implemented method of claim 1, wherein the representing includes assigning the one or more representations to the strength attribute based on a mapping table that correlates a plurality of attributes to a plurality of corresponding representations.

6. The computer-implemented method of claim 2, further comprising notifying the client device of the access granted to the resource.

7. The computer-implemented method of claim 2, wherein the authorization policy provides different access levels based on representations, and wherein the granting access to the resource includes granting a specific access level based on one or more attributes represented by the one or more representations.

8. The computer-implemented method of claim 1, wherein the identifying further includes identifying a type attribute of the authentication input, and wherein the representing includes representing the strength attribute of the authentication input, the type attribute of the authentication input, and the amount of trust in the authentication input with the one or more representations.

9. The computer-implemented method of claim 1, wherein the one or more representations include at least one representation that is one of an Object Identifier (OID), a Globally Unique Identifier (GUI D), a Security Identifier (SID), or a strong representation.

10. The computer-implemented method of claim 8, wherein the type attribute is configured to identify the authentication input as being obtained by one of a face-to-face request, a local network request, or a remote network request.

11. The computer-implemented method of claim 2, wherein the authorization policy is stored in one of a local location or a networked remote location.

12. The computer-implemented method of claim 11, wherein the local location is an Active Directory.

13. The computer-implemented method of claim 2, wherein the resource is one of an operating system, an application, or a service on a resource server.

14. The computer-implemented method of claim 2, wherein the comparing the one or more representations includes using at least one of an application, an operating system, a resource manager, or an authorization system to compare the one or more representations against the authorization policy.

15. The computer-implemented method of claim 2, wherein at least one of the representations and the authorization policy is formatted in one of Abstract Syntax Notation number One (ASN.1), Extensible Markup Language (XML), or eXtensible rights Markup Language (XrML).

16. A computer readable memory having computer-executable instructions that, when executed, perform acts comprising:
  issuing an authentication input according to an issuance policy, the issuance policy dictating one or more identification verification procedures that are performed prior to the issuing the authentication input;
  receiving the authentication input at an authentication authority using an authentication protocol, the authentication input being sent from a client device associated with a user;
  identifying at least one of a strength attribute or a type attribute of the authentication input;
  identifying an amount of trust in the authentication input, the amount of trust corresponding to a strictness of administrative rules under which the authentication input was issued;
  representing an identifier of the issuance policy, the strength attribute or the type attribute of the authentication input, and the amount of trust in the authentication input with one or more representations selected from a plurality of representations; and
  returning a token that includes the one or more representations to the client device using the authentication protocol.

17. The computer readable memory of claim 16, wherein the plurality of representations include at least one representation that is one of an Object Identifier (OID), a Globally Unique Identifier (GUID), a Security Identifier (SID), or a strong representation.

18. The computer readable memory of claim 16, wherein the token is an authorization token, a service token, or a Security Assertion Markup Language (SAML) token.

19. The computer readable memory of claim 16, wherein the authentication protocol is a NT LAN Manager (NTLM) protocol, a Kerberos protocol, a Web Services (WS)-security protocol, a Public Key Cryptography for Initial Authentication in Kerberos (PKINIT) protocol, a Secure Sockets Layer (SSL) protocol, or a Transport Layer Security (TLS) protocol.

20. A system, the system comprising:
  one or more processors; and
  memory to store a plurality of computer-executable instructions for execution by the one or more processors, the computer-executable instructions comprising:
    receiving an authentication input provided by a client device at an authentication authority using an authentication protocol, the authentication input being inputted into the client device to identify a user that requests access to a resource;
    identifying a strength attribute of the authentication input that is different than a type attribute of the authentication input, the strength attribute representing a permutational complexity or a cryptographic complexity of the authentication input;
    comparing the strength attribute of the authentication input with a directory that includes a plurality of predefined representations, each representation providing a corresponding level of access to one or more resources;
    selecting a matching predefined representation from the plurality of predefined representations when the matching predefined representation matches the strength attribute of the authentication input that identifies the user that requests the access to the resource;
    selecting a default predefined representation from the plurality of predefined representations when no other predefined representation matches the strength attribute of the authentication input that identifies the user; and
    providing the matching predefined representation or the default predefined representation to the client device in a token.

* * * * *